United States Patent Office 3,011,609
Patented Dec. 5, 1961

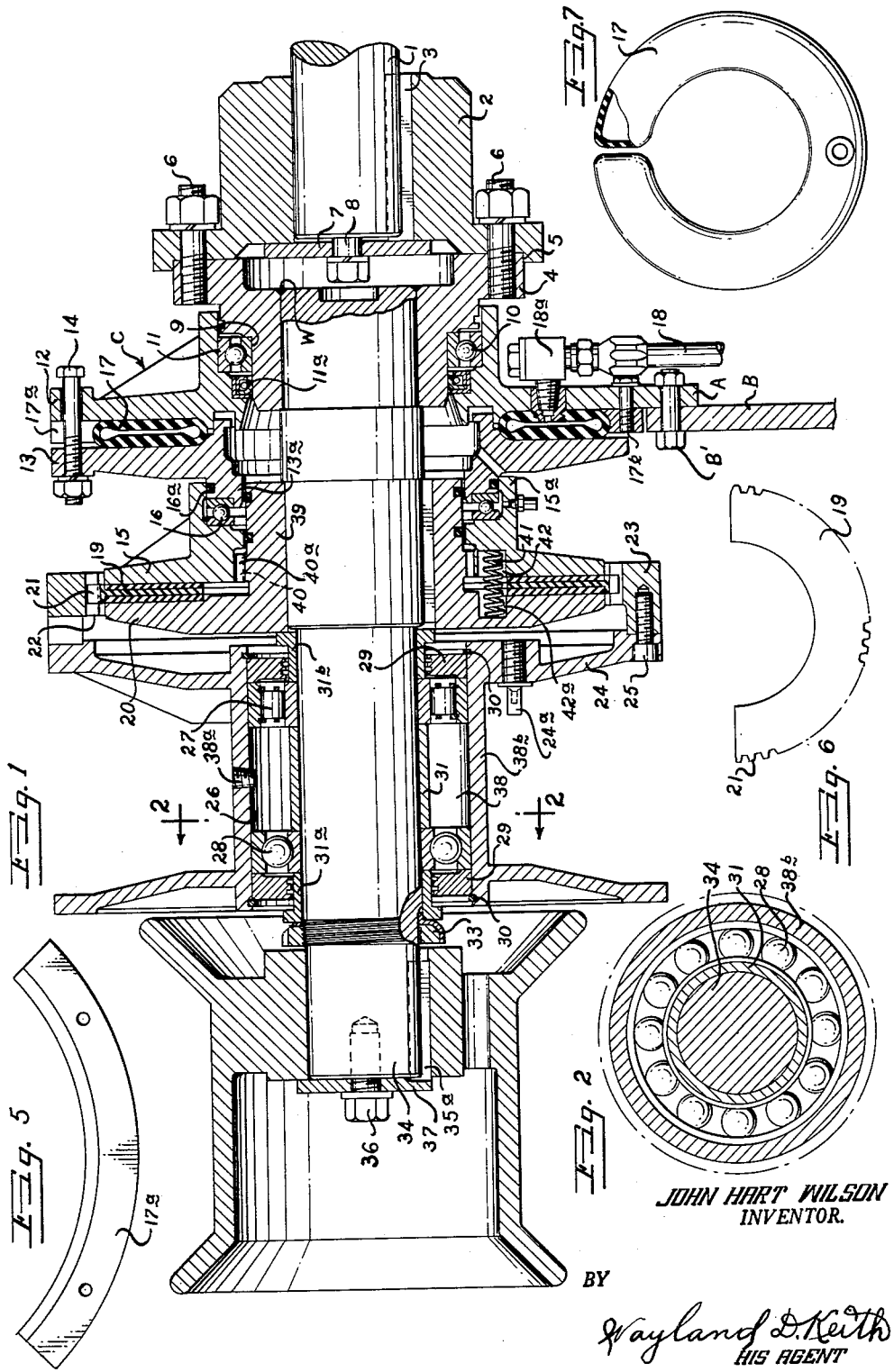

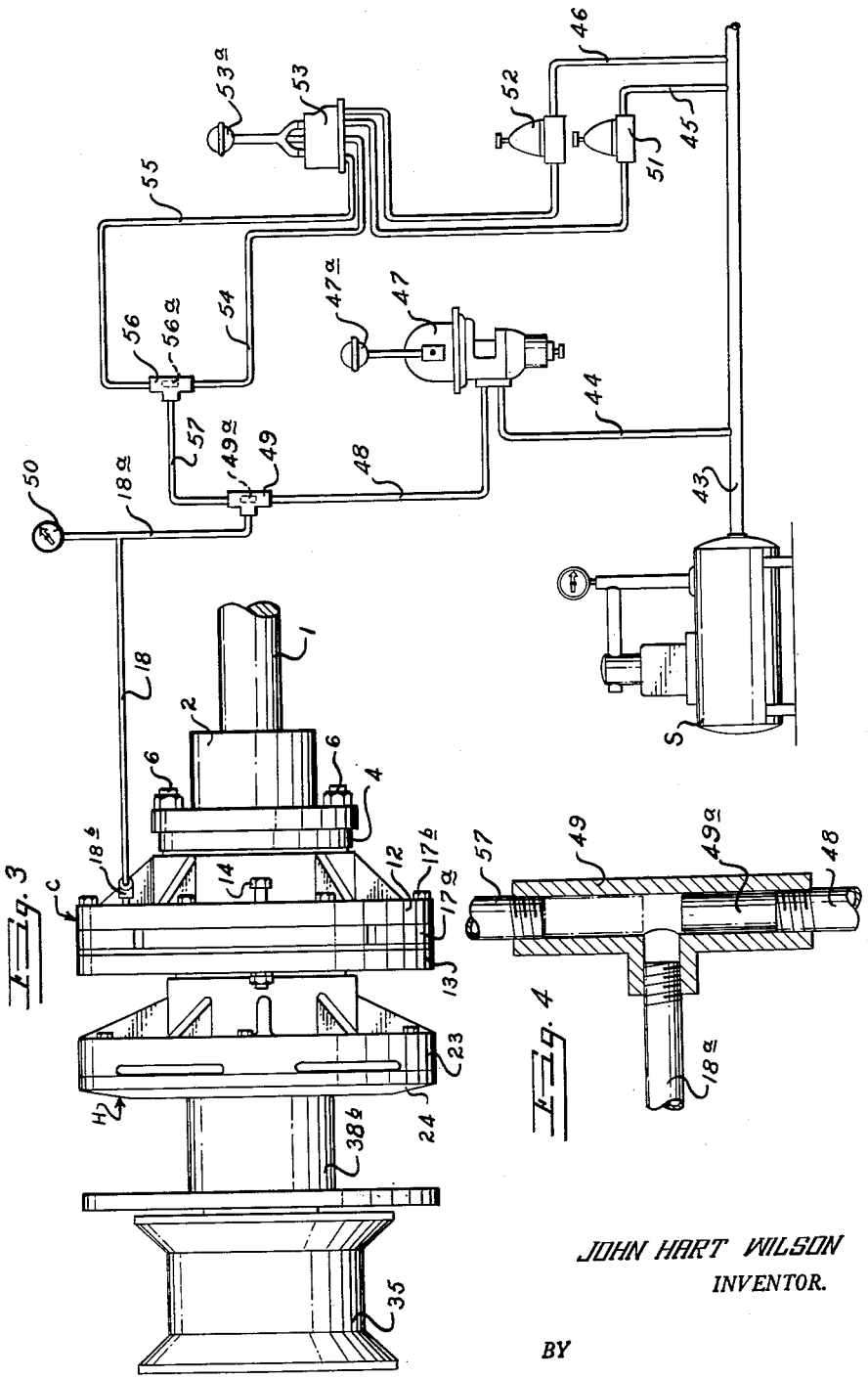

3,011,609
FLUID PRESSURE ACTUATED CLUTCH MECHANISM FOR CATHEADS AND THE LIKE
John Hart Wilson, % Wilson Manufacturing Company, P.O. Box 1031, Wichita Falls, Tex.
Original application Jan. 17, 1952, Ser. No. 266,837, now Patent No. 2,887,202, dated May 19, 1959. Divided and this application July 7, 1958, Ser. No. 746,925
2 Claims. (Cl. 192—88)

This present application is a division of my prior application Ser. No. 266,837, filed January 17, 1952, for Catheads, now Patent No. 2,887,202, granted May 19, 1959.

This invention relates to improvements in catheads, and more particularly to catheads employing fluid pressure actuated clutch mechanism to enable selective rotation thereof.

Various catheads have been proposed heretofore, but these have had certain undesirable characteristics for use with rotary drilling rigs.

The present cathead may be built comparatively light, but at the same time a sturdy unit is produced, which is sufficiently powerful to perform the same type of work usually done by much heavier equipment.

An object of this invention is to provide a cathead, the spool of which is journaled on anti-friction bearings, and which spool has a clutch plate coupled thereto and rotatable therewith, which clutch plate is clamped intermediate a pair of clutch members when the clutch is in engaged position and which is spaced intermediate the clutch members when the clutch is in disengaged position.

Another object of this invention is to provide a cathead in which a closed, resilient, tubular element is provided for the reception of the fluid medium for actuating the clutch.

Another object of this invention is to provide a cathead which remains in non-rotatable relation, when disengaged from the driving element, and which rotates when engaged by the fluid actuated clutch.

Yet another object of the invention is to provide a cathead which will deliver torque of predetermined magnitude.

A still further object of this invention is to provide a cathead with a fluid actuated clutch which is engaged by fluid pressure and which is disengaged by resilient means.

An embodiment of this invention is illustrated in the accompanying drawings in which like reference characters designate like parts in the several views thereof, in which:

FIG. 1 is a longitudinal sectional view through the cathead, showing certain elements in elevation and broken away to illustrate the details of construction;

FIG. 2 is a sectional view taken on the line 2—2 of FIG. 1, looking in the direction indicated by the arrows;

FIG. 3 is a diagrammatic view of a cathead installed within a fluid system, for the selective engagement of the cathead with the drive member;

FIG. 4 is a longitudinal sectional view through a two-way check valve, as used in the system;

FIG. 5 is an elevational view of one of the segmental clutch tube retaining members;

FIG. 6 is an elevational view of one of the segmental friction elements; and

FIG. 7 is an elevational view of the clutch tube removed from the cathead clutch, with a portion broken away and shown in section, to bring out the details of construction.

With more detailed reference to the drawing, the numeral 1 designates a counter-shaft of a rotary drilling rig on which is fitted a flanged coupling 2, which flanged coupling 2 is keyed thereon by means of a key 3. A complementary flanged unit 4 is welded to the end of shaft 34 at W, which complementary flanged unit 4 is interfitted within the pilot bore 5 within flanged coupling 2, so as to align the cathead unit, designated generally by the letter H, with the counter-shaft 1. Studs or bolts 6 connect the two flanged units 2 and 4 together in unitary driving relation.

The flanged units 2 and 4 are recessed to receive a plate 7 which is bolted to the end of shaft 1 by means of a cap screw 8. The complementary flange unit 4 has a shoulder 9 formed thereon, on which an antifriction bearing 10 is fitted, and which bearing 10 is also fitted within a bore 11 of the clutch tube support member 12, so as to journal the clutch tube support member thereon.

The clutch tube support member 12 is positioned a spaced distance from a movable tube reaction plate 13. Circumferentially spaced bolts 14 are loosely positioned through the clutch tube support member 12 and the tube reaction plate 13, so as to prevent relative rotary movement therebetween, but which will permit a limited axial movement of the movable tube reaction plate 13 with respect to the tube support member 12.

An axially expansible clutch tube 17 is positioned intermediate the tube support member 12 and the reaction plate 13, which clutch tube 17 is substantially annular, except that the ends of the tube are not joined, as shown in FIG. 7, which will permit the removal of the tube 17 laterally, by removing segmental clutch tube retaining member 17a. It is preferable to have four of these clutch tube retaining members 17a, which will be held in place by bolts 17b. With the segmental friction elements 19 removed, the axially movable clutch pressure plate 15 may be moved toward the cathead drum 24 sufficiently to remove tube 17, when bolts 14 and 17b and clutch tube segmental retaining members 17a are removed.

A clutch pressure plate 15, having teeth 40 therein, is slidably mounted on the shoulder portion 39, which has teeth 40a thereon, which teeth 40 and 40a interfit in sliding relation and are connected for unitary rotation, upon rotation of shouldered hub 39. The shouldered hub portion 39 is keyed to shaft 34 by a key 39a and rotates therewith, upon rotation of the shaft. A thrust bearing 16 is fitted between hubs 13a and 15a for transmitting axial outward movement to pressure plate 15, upon axial movement of tube reaction plate 13, upon axial expansion of tube 17. The back-up plate 20 is made integral with shouldered hub portion 39, so that the clutch pressure plate 15 and back-up plate 20 will rotate in unison. Recesses 42 and 42a are complementally formed at circumferentially intervals in clutch pressure plate 15 and back-up plate 20, respectively, to receive springs 41, which springs tend to urge clutch pressure plate 15 into engagement with thrust bearing 16 to disengage the pressure plate 15 and back-up plate 20 from the friction element 19, positioned therebetween, upon release of pressure from the tube 17. The friction elements 19 are composed of a pair of semi-annular segments which have teeth 21 on the periphery thereof, which teeth interengage with teeth 22 which are made on the inner diameter of annular ring 23. In this manner the semi-annular friction elements 19 and annular ring 23 are connected for unitary rotation by teeth 21 and 22, on the respective elements. Spacer sleeves 31a, 31 and 31b are interposed between nut 33 and the outer face of back-up plate 20, so as to hold the bearings 28 and 27 in spaced relation, and at the same time, hold the back-up plate 20 against axial movement. Upon application of pressure to tube 17, reaction plate 13 will transmit thrust axially through thrust bearing 16 and to clutch pressure plate 15 to clamp the friction elements 19 between the clutch plate 15 and back-up plate 20, and torque will be transmitted through the teeth 21 to annular ring 23 upon the turning of the shaft 34. The annular ring 23 is attached to one end of the clutch controlled cathead drum 24, by means of cap screws 25.

The segmental friction elements 19 may be inserted between and removed from between clutch pressure plate 15 and back-up plate 20, by removing screws 25 and moving the annular ring 23 axially away from the clutch controlled cathead drum 25, until the segmental elements 19 may be removed laterally, and if necessary, be replaced with unworn elements, then the annular ring may be replaced so the teeth 22 of the annular ring 23 will engage the teeth 21 of the segmental friction elements 19, after which the annular ring 23 may be secured in place by means of cap screws 25. It will be readily appreciated that the segmental friction elements 19 may thus be easily removed and replaced without removing the cathead from the shaft.

When torque is transmitted from shaft 1 through flanges of the respective couplings 2 and 4 to shaft 34 and through key 39a to hub 39 and through teeth 40 on shouldered hub portion 39 to the teeth 40a within the bore of clutch pressure plate 15, and with the tube 17 exerting an outward axial movement to clutch pressure plate 15, the frictional elements 19, having teeth 21 on the periphery thereof, will be clamped between back-up plate 20 and clutch pressure plate 15, which will cause torque to be transmitted through the teeth 21 and through teeth 22 within the inner bore of the annular ring 23, which in turn, will be rotated. An arm A extends outward from tube support member 12 and is bolted to a stationary bracket B, to prevent rotation of the member 12.

The cathead drum 24 is preferably cast in one piece and is bored at 26 to receive anti-friction bearings 27 and 28. A cable is normally attached to the clutch controlled cathead drum 24 by means of an eye bolt 24a, and since the cable is relatively heavy, as is the clutch controlled cathead drum 24, the cathead will remain stationary, when the clutch is disengaged, with the shaft 34 turning freely therein on anti-friction bearings 27 and 28. With the bearings 27 and 28 properly lubricated, little or no creep or turning of the cathead drum is experienced, because of the weight thereof, and since the primary intent of the cathead is to put up several thousand pounds line pull, the small amount of torsional force exerted to the cathead drum, by the drag on the anti-friction bearings 27 and 28, is so negligible as to be of no consequence. The clutch controlled cathead drum 24 is provided with grease retaining seals 29, which seals are held in place by lock rings 30.

The bearings 27 and 28 have a spacer 31, spacers 31a and 31b on the inner and outer sides of the bearings respectively, which bearings are held in adjusted position by a nut 33 which is screw threaded to the end of cathead shaft 24. The back-up plate 20 is held against outward axial movement by nut 33 and the aforementioned sleeves and bearings. A further or outer cathead 35 is provided on shaft 34, which cathead 35 is keyed to the shaft 34 by means of key 35a so the cathead will rotate upon rotation of the shaft 34.

The outer cathead 35 is held against axial outward movement by a cap screw 36 and plate 37, which cap screw passes through plate 37 and is screw threaded into the end of shaft 34, so as to hold the plate 37, which is larger than the diameter of the shaft, against the outer face of the hub of the outer cathead 35.

It is preferable to fill the annular space within the cathead drum 24 with a suitable lubricant for lubricating the bearings 27 and 28 therein. A plug 38a is provided in cathead drum barrel 38b, for the introduction of lubricant into the annular space 38 in the clutch controlled cathead drum 24.

The clutch pressure plate 15 is slidably mounted on the shouldered portion 39 of back-up plate 20 and is interconnected therewith by means of teeth 40 therein interengaging with teeth 40a on the shouldered portion 39. This enables the clutch to be applied, whether the shaft is rotating or not rotating, without any torsional effect on the fluid tube 17.

Circumferentially spaced springs 41 are positioned radially outward from the shaft 34 and are fitted within circumferentially spaced recesses 42 and 42a, which are formed in the clutch pressure plate 15 and back-up plate 20, respectively.

FIG. 3 shows the cathead H installed on the countershaft 1 of a well drilling rig, within the fluid pressure system, wherein the cathead clutch may be selectively engaged to give the desired engagement thereof, which regulates the torque applied to the clutch controlled cathead H.

An air supply line 43 is provided, which leads from a source of air S to supply lines 44, 45 and 46. The pipe 44 has a variable pressure control valve 47 therein, which valve may be regulated to give from zero pressure to the maximum amount of pressure of the air or other fluid in the line 43, and will direct this air into pipe 48, through two-way check valve 49 into line 18a and hose 18. A pressure gauge 50 may be provided within line 18a to enable the pressure therein to be readily determined. The air pressure applied to tube 17 through variable pressure control valve 47 determines the amount of torque that will be applied to the cathead H. The pressure supply line 43 may carry any desired pressure, but for purposes of illustration, it will be assumed to carry one hundred pounds, and when the full pressure is applied to the tube 17, the cathead clutch C is engaged to carry the maximum rated torque of the cathead. By having the variable control valve positioned within the line, any amount of pressure may be made available to supply the desired amount of torque, within the skill of the operator.

However, in certain operations, it is not always possible to evaluate the amount of torque that should be applied to the cathead. Therefore, to eliminate guess work and the hazards incident thereto, regulators 51 and 52 have been provided within the respective lines 45 and 46, which lead from the supply line 43 to and through four-way control valve 53. Two lines 54 and 55, lead from the four-way control valve 53 to opposite sides of a two-way check valve 56, which valve is similar to the valve 49 in construction, and as shown in detail in FIG. 4. The outlet line 57, of the check valve 56, connects with one end of two-way check valve 49 to direct air thereinto and therethrough, as will be more fully explained hereinafter.

The four-way control valve 53 is provided, which has lines 45 and 46 leading thereinto and lines 54 and 55 leading outward therefrom. A handle 53a is provided to selectively position valve 53 to connect lines 45 and 54, when in one position, and to connect lines 46 and 55, when in another position, and when in the intermediate position, lines 45 and 46 will be closed and lines 54 and 55 will be opened to atmosphere, so as to enable the release of the clutch. As a matter of explanation, the respective positions of the valve 53 will be referred to as "low pressure," "high pressure" and "off" positions.

In certain instances, it is desirable to apply a predetermined amount of torque to the cathead H, as would be the case when screwing pipe together lightly, which is called "spinning," and is used in connecting drill stem pipe as used with rotary well drilling rigs. It is desirable to couple the pipe together rapidly, but with relatively low torque, until the threads begin to tighten. It is then necessary to tighten the threads a predetermined amount, an amount which will be sufficient to tighten the threads to prevent a leaking joint, and to prevent separation of the pipe at the joint, but not tight enough to twist the pipe in two or to damage the threads.

With the properties of the pipe and the strength of the threads being known, it is possible to calculate mathematically, or it may be determined by experiment, the amount of torque to be applied to the threads to give the desired results. With the amount of torque to be applied to the screw-threaded pipe determined, and with the torque of the clutch controlled cathead H known, when the clutch C is engaged at various pressures, with regulators to obtain the desired pressure and valves to direct the desired amount of air to the cathead clutch C at the predetermined pressure, the pipe may be swiftly and safely screwed together, as desired, with practically the same torque being applied to each joint.

For purposes of illustration, as to the technique of using the clutch with a predetermined setting of the regulator, to enable the pipe to be quickly and safely screwed together, the handle 53a, of the four-way valve 53, may be set in a position to deliver "low" pressure air to the clutch, which, in the present instance, will be setting the regulator in the line 45 at five to ten pounds.

With the valve and the regulator set, as described above, the air will be directed from air supply S through lines 43 and 45, regulator 51 through valve 53 into line 54, causing the slide member 56a of slide valve 56 to move upward, which will close line 55 and direct air into line 57 and thence into check valve 49, to move slide member 49a downward to close line 48 so as to direct air into line 18a to gauge 50 and into hose 18, through quick release valve 18b into clutch tube 17 so as to cause an axial expansion thereof and axial movement of reaction clutch plate 13, which will cause frictional engagement of friction element 19 between clutch pressure plate 15 and back-up plate 20, which will drive the cathead spool 24 with a relatively low torque. The pipe will then rotate until it requires a greater torque than the clutch will exert at this pressure, after which, the clutch will slip.

The handle 53a may be shifted from "low pressure" position to the "high pressure" position, so as to direct the air pressure from supply S, through lines 43–46, through regulator 52, through valve 53 into line 55, which pressure will shift sliding valve member 56a of check valve 56, so as to close line 54 and open line 55 to communicate with line 57, which will cause the shifting of slide member 49a in check valve 49, to close line 48 so as to direct air from line 57 into line 18a and hose 18 leading to the clutch tube 17. In so doing, the air pressure passing through regulator 52 will fill tube 17 to move reaction plate 13 axially against thrust bearing 16, to cause clutch pressure plate 15 to compress springs 41 to clamp friction element 19 between pressure plate 15 and back-up plate 20.

With the friction element 19 clamped between clutch pressure plate 15 and back-up plate 20, the driving torque of shaft 1 will be transmitted through teeth 40 and 40a to pressure plate 15 and through teeth 21 and 22 to ring 23, which is bolted to cathead drum 24, so as to rotate the cathead for transmission of the desired amount of torque, as indicated by the regulator 52, for the final make-up of the threaded pipe connection, after which the clutch will slip.

In moving either of the handles 53a or 47a to the "off" position, a lowering of the pressure in the respective lines will be brought about, which will cause the reverse flow of the air from tube 17, which air will cause quick release valve 18b to open, letting the air move out therethrough, and with the air flowing outward, the quick release valve 18b will by-pass the air to atmosphere, in a manner well understood in the art.

Bearings 11 and 16, of the anti-friction type, are provided with grease seals 11a and 16a, so as to retain lubricant in and around the respective bearings. The grease seal 16a may be made with sufficient frictional engagement between interengaging hubs 15a and 13a to off-set any frictional drag that may be caused by bearings 27 and 28, thus the clutch controlled drum 24 will be prevented from rotating under the influence of friction transmitted through bearings 27 and 28, while the clutch is disengaged, however, seal 16a will not provide enough friction to retard the free rotation of the cathead drum 24, when the clutch is released.

While the invention has been illustrated and described in some detail, it is to be understood that changes may be made in the minor details of construction and adaptations made to particular applications, without departing from the spirit of the invention as set out in the appended claims.

Having thus described the invention, what is claimed as new and desired to secure by Letters Patent is:

1. A clutch mechanism comprising; a shaft extension, a driven member journaled on said shaft extension, an internally toothed, annular ring secured to said driven member and extending outward therefrom and being rotatable therewith and coaxial with said shaft extension, a toothed friction element within said annular ring and complementally engageable and rotatable with said annular ring and movable axially thereof and being coaxial with said shaft extension, a back-up plate, having a hub thereon mounted on said shaft extension and positioned intermediate said friction element and said driven member, which back-up plate is secured against movement with respect to said shaft extension, said back-up plate having teeth formed on the periphery of the hub thereof, an annular clutch pressure plate surrounding said hub of said back-up plate, which annular clutch pressure plate has teeth formed within the bore thereof to complementally engage said teeth of said hub of said back-up plate in sliding relation, a flanged coupling mounted on and secured to said shaft extension on the end thereof opposite said driven member, a stationary flange, forming a tube support member, surrounding said shaft extension and being coaxial therewith and journaled on said flanged coupling, means securing said stationary flange non-rotatable with respect to said shaft extension, a reaction plate positioned adjacent said stationary flange and being coaxial with said shaft extension and movable axially thereof and being fixed against rotation with respect thereto, an axially expansible, closed, elastomer tube fitted between and being in contact relation with said stationary flange and said reaction plate, said tube having a fluid opening formed in a side thereof for connection of a fluid pressure conduit thereto, means limiting the axial movement of said reaction plate away from said stationary flange, a thrust bearing interposed between said reaction plate and said clutch pressure plate and being in contact with said reaction plate and said clutch pressure plate, resilient means to urge said reaction plate toward said tube, means complementally connecting said flanged coupling to a rotatable shaft, and segmental clutch tube retaining members secured to said stationary flange to form a support for said tube.

2. A clutch mechanism as defined in claim 1, wherein said segmental clutch tube retaining members are concave transversely to complementally fit the contour of said elastomer tube on at least a portion of the periphery of said elastomer tube.

References Cited in the file of this patent

UNITED STATES PATENTS

| | | |
|---|---|---|
| 634,292 | Gibbs | Oct. 3, 1899 |
| 1,792,093 | Holmes | Feb. 10, 1931 |
| 1,803,430 | Hand | May 5, 1931 |
| 1,864,126 | Ferris | June 21, 1932 |
| 2,020,640 | Guenther | Nov. 12, 1935 |
| 2,391,939 | Bannister | Jan. 1, 1946 |
| 2,395,239 | White | Feb. 19, 1946 |
| 2,447,280 | Rowe | Aug. 17, 1948 |
| 2,587,230 | Schaad | Feb. 26, 1952 |
| 2,682,892 | Picard | July 6, 1954 |

FOREIGN PATENTS

| | | |
|---|---|---|
| 477,017 | Germany | May 29, 1929 |